April 18, 1967     D. L. AMSDEN     3,314,105
APPARATUS FOR INJECTION MOLDING A BLOWABLE PARISON
Filed June 17, 1963     2 Sheets-Sheet 1

INVENTOR.
DONALD L. AMSDEN
BY
ATTORNEYS

April 18, 1967   D. L. AMSDEN   3,314,105
APPARATUS FOR INJECTION MOLDING A BLOWABLE PARISON
Filed June 17, 1963   2 Sheets-Sheet 2

INVENTOR.
DONALD L. AMSDEN
BY
ATTORNEYS 3,314,105
APPARATUS FOR INJECTION MOLDING A BLOWABLE PARISON
Donald L. Amsden, Toledo, Ohio, assignor to Owens-Illinois, Inc., a corporation of Ohio
Filed June 17, 1963, Ser. No. 288,201
6 Claims. (Cl. 18—5)

The present invention relates to an apparatus for making a blown plastic article. More particularly, the present invention is concerned with an apparatus for and a method of forming a blowable shape or parison from which a plastic article is formed.

In the manufacture of blown articles, such as containers, various methods of and apparatus for parison formation have been proposed. In the copending application of Thomas R. Santelli, Ser. No. 146,686, filed Oct. 17, 1961, now abandoned, and assigned to the assignee of the present invention, there is disclosed a method of and apparatus for forming a parison by injection molding plasticized material in an open ended parison recess and about a parison sleeve or "pin" projecting axially into the recess and terminating in spaced relation to one end thereof. The parison forming process results in a generally cylindrical parison having a closed end, thus forming a bubble which can be inflated, after enclosure in a pair of blow molds, to form the final article.

In the manufacture of elongated articles requiring an equivalent elongated parison, some difficulty has been encountered in the lateral displacement of the centrally located parison pin which, in order to form the closed-bottom parison, must project into the parison mold space in cantilever fashion. The present invention provides an improvement over the process of the above-identified Santelli application by providing a parison pin stabilizing element for accurately retaining the parison pin in its axial location in the parison mold recess while still accommodating the formation of the parison bottom wall.

In order to support the cantilevered end of the parison pin, a multi-purpose stabilizer or support element is provided; this support element serving (during injection molding of the parison side wall portions) to stabilize the parison pin and to align the pin axially in the parison mold, and being movable to a second position out of contact with the parison pin (during the formation of the parison bottom) and finally serving as a valve to shut off the flow of plasticized material to the parison chamber (after the complete parison has been formed).

In this manner, it is possible to (1) stabilize and align the cantilevered parison pin in the parison mold chamber during formation of the parison side walls; (2) form the parison bottom wall only after the parison side walls have been formed; and (3) shut off the flow of plasticized material to the parison chamber after the complete parison has been formed. All of these functions are, in essence, carried out by the utilization of a single structural element together with a single acting biasing means urging the element to its initial, parison pin-stabilizing position and accommodating movement of the element to its other positions.

The object of this invention is the provision of a parison forming apparatus wherein a parison pin is accurately retained in position during parison formation by means of a single, multi-purpose element serving both to stabilize the parison pin and to control the flow of plasticized material to the parison forming chamber.

It is yet another, and no less important, object of this invention to provide an apparatus for injection molding a parison and including a displaceable valve element serving to stabilize a parison pin during formation of the major portion of the parison and movable toward a different position to accommodate the formation of the parison bottom until such time as the parison has been completed and then, when the different position is attained, interrupting the flow of plasticized material to the parison chamber.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
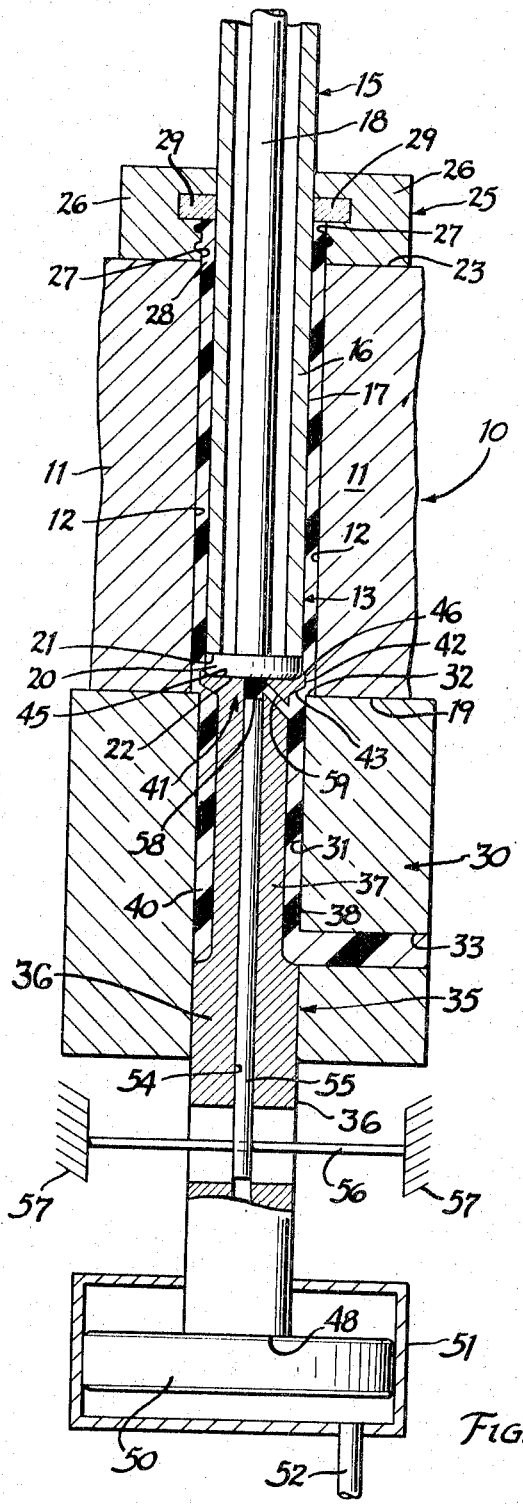
FIGURE 1 is a vertical sectional view, with parts shown in elevation, illustrating an apparatus of the present invention capable of carrying out the method of the present invention, the apparatus being illustrated with the parison pin being stabilized during formation of a major portion of the parison.

As shown on the drawings:

In FIGURE 1, reference numeral 10 refers generally to an apparatus of the present invention comprising a parison mold 11 of the type illustrated in the above-identified Santelli application and having a central, vertically extending, generally cylindrical recess 12 defining the outer wall of a parison mold chamber indicated generally at 13. Projecting into the parison mold recess 12 is a parison pin indicated generally at 15 and comprising an outer, generally cylindrical sleeve 16 having an exterior peripheral surface 17 spaced radially from the recess surface 12 to form the inner portion of the parison chamber 13.

Projecting axially through the sleeve 16 is an actuating rod 18 bearing at its lower end an enlarged valve head 20 contacting the free lower angular extremity 21 of the sleeve 16. The diameter of the valve head 20 is substantially the same as the external diameter of the sleeve 16, the valve head 20 and the sleeve 16 cooperatively defining the parison pin 15. It will be noted that the exposed lower surface 22 of the valve head terminates in spaced relation to the lower extremity 19 of the parison mold 11.

Abutting the exposed upper surface 23 of the parison mold 11 is a neck mold structure indicated generally at 25 and comprising a pair of laterally separable neck mold blocks 26 having cooperative, semi-annular recesses 27, respectively, surrounding the sleeve 16 and defining therewith an interior mold recess 28 having the contour of a finished, non-blown portion of the final article to be formed, such as the neck of a blown container. Each of the neck mold sections 26 carries an insert 29 defining the upper end of a complete parison mold space.

The parison mold 11 is superimposed upon a supply block indicated generally at 30 and having a cylindrical bore 31 therethrough axially aligned with, but slightly smaller than the mold space 13. At the intersection of the mold space 13 and the bore 31, an inwardly and upwardly directed shoulder 32 is defined, this shoulder being annular in configuration. The bore 31 is adapted to receive plasticized material from a suitable source, such as a plasticizer-extruder (not shown) through a lateral supply passage 33. Projecting axially through the bore 31 is an axially displaceable stabilizer or valve body, indicated generally at 35. This valve body 35 is generally cylindrical in configuration and includes a lower portion 36 having an external diameter snugly fitting within the recess 31. A reduced diameter cylindrical central portion 37 is provided with an exterior surface 38 spaced radially inwardly from the surface of the bore 31 to define an annular material flow passage 40 communicating with the supply passage 33. The upper surface of the valve body 35 is defined by an enlarged valve head 41 having an external diameter 42 substantially the same as the diameter of the bore 31 and smaller than the diameter of the parison mold bore 11. This exterior diameter 42 is joined to the medial portion 37 of the valve body by a chamfered joining portion 43.

The free upper surface 45 of the terminal valve portion 41 is recessed to snugly receive thereagainst the exposed undersurface 22 of the valve head 20, when the apparatus is positioned as illustrated in FIGURE 1. It will be noted that the head portion 41 of the valve body 35 is of a diameter greater than the diameter of the valve head 20 of the parison 10 and an annular, upwardly directed, exposed surface 46 is provided about the valve head, this surface being exposed to material filling the parison chamber 13.

Further, it will be noted that the enlarged portion 36 of the valve body 35 extends below the supply block 30 and is secured at its lower end, as at 48, to a fluid motor piston 50 enclosed within an actuating cylinder 51 adapted to receive fluid under pressure through a supply line 52 leading, for example, to a source of compressed air. The piston-cylinder 50, 51 thus serves to bias the valve body 35 to its upper, stabilizing position of FIGURE 1.

The valve body 35 is provided with an axial bore 54 within which is positioned a valve pin 55, this valve pin being fixed against axial displacement by means of laterally projecting struts or supports 56 secured to a part of the machine frame indicated schematically at 57. The upper extremity 58 of this valve pin 55 terminates short of the end of the valve bore 54, when the valve element is positioned as illustrated in FIGURE 1 of the drawings, so as to provide communication between the valve bore 54 and the material supply passage 40 through a radial material passage 59 in the valve body.

Figure 2:
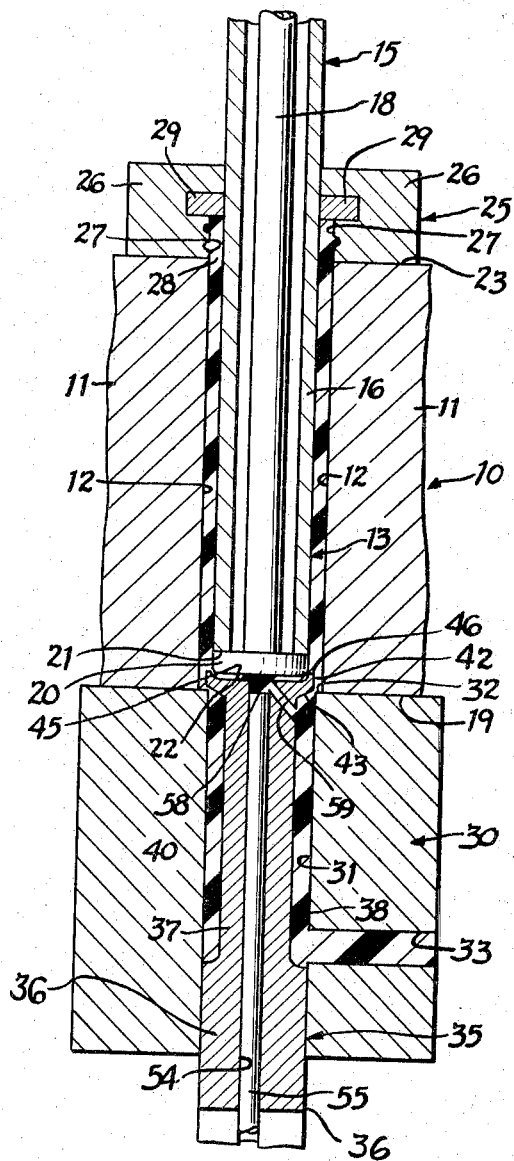
FIGURE 2 is a view similar to FIGURE 1 illustrating the apparatus during formation of the parison bottom.
Figure 3:
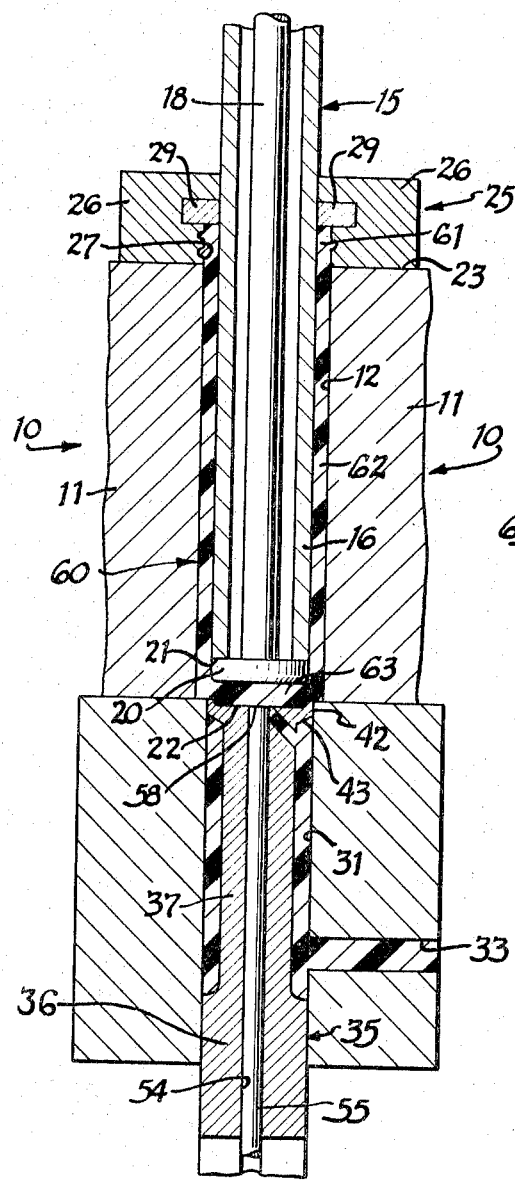
FIGURE 3 is a view similar to FIGURES 1 and 2 and illustrating the formation of the complete parison.
Figure 4:
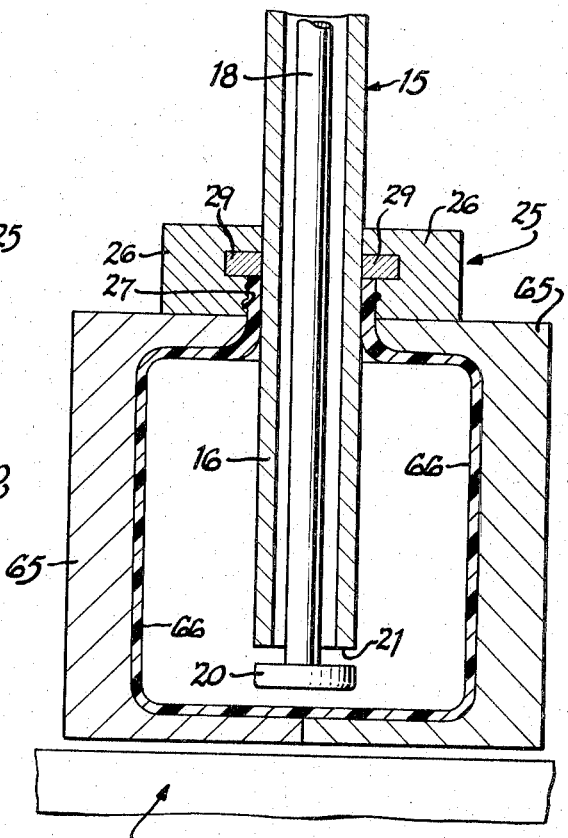
FIGURE 4 is a view illustrating the blowing of the parison to its final article configuration.

The operation of the apparatus and the performance of the method of the present invention will be readily appreciated by a comparison of FIGURES 1, 2 and 3.

As best shown in FIGURE 1, the apparatus is initially positioned with the parison pin assembly 15 inserted into the recess 12 to define the annular mold space 13 and with the neck ring sections 26 assembled as illustrated to define the upper neck mold cavity 28. Pressure within the conduit 52 and the cylinder 51 will urge the piston 50 upwardly, thereby displacing the valve element 35 into abutment with the undersurface of the valve head 20, i.e. the free upper surface 45 of the valve body will abut the undersurface 22 of the valve head 20. Of course, in this position the valve element 35 completely masks the free extremity of the parison pin 15.

Next, plasticized material under pressure from the source (not shown) enters the mold space 13 through the supply passage 33 and the flow passage 40, the material passing between the exterior periphery 42 of the valve body head 41 and the bore wall 12 of the parison mold 11 to completely fill the mold space 13 with plasticized material. Due to contact between the valve body 35 and the parison pin 15, the pin 15 is stabilized in the parison mold recess against any radial displacement during flow of the material into the mold space.

After filling of the mold space 13, the material therein is subjected to the injection pressure, this pressure acting on the exposed annular surface 46 at the free end of the valve body 35 to displace the valve body downwardly against the biasing means, i.e. the cylinder 51 and piston 50. This net force on the valve body results from the fact that forces exerted on the oppositely directed surfaces at the ends of the valve body groove 38 cancel one another so that there will be a net displacing force upon the surface 46. As the valve body 35 is first urged downwardly, the end surface 45 of the valve body becomes spaced from the end surface 22 of the valve head 20 and the position of FIGURE 2 is attained. At this time, the entire end face of the head portion 41 of the valve body 35 is subjected to the pressure of the plasticized material to further urge the valve body toward its position of FIGURE 3.

At the same time, communication is now established between the space between the surfaces 22, 45 and the plasticized material by means of the radial passage 59 and the end of the valve body bore 54, so that plasticized material is introduced onto the undersurface of the valve head 20 to initiate the formation of the closed end of the parison. As the valve body 35 moves toward its position of FIGURE 3, additional material is fed into the space between the valve head 20 and the valve body 35, until such time as the valve body has been telescopically moved over the valve pin 55 to such an extent that the valve pin becomes flush with the valve body end face 45, at which time the valve pin completely fills the valve body bore 54 and no further material can be fed through the radial passage 59. This position is illustrated in FIGURE 3 of the drawings. At the same time, the enlarged valve head entering the bore 31 of the material supply block 30 shuts off the flow of further plasticized material into the mold space 13, thereby fulfilling the valving function of the valve body 35.

Thus, by the time that the position of FIGURE 3 is attained, a complete parison is formed, the parison consisting of the finish or neck portion 61, the cylindrical side walls 62 and a complete parison bottom 63, the parison being completely isolated from the supply conduit 33 by the valve body 35 interposed therebetween.

Finally, the completed parison 60 is stripped from the parison mold 10 by relative axial displacement or, alternatively, by opening the parison mold 11 in the event that a split-type parison mold is utilized. The parison is preferably transferred as a unit with the parison pin 15 to be enclosed in a pair of separable blow mold sections 65 having their inner surfaces 66 contoured to the configuration of the fiinished article. Next, the valve head 20 is moved relative to the sleeve 16 and blow air under pressure is introduced through the sleeve and about the head actuating rod 18 to inflate the parison from the sleeve 16 and against the chill walls 66 of the blow mold 65. Finally, the blow molds are opened and the finished article is removed.

Thus, it will be appreciated that the present invention provides a method of and apparatus for forming a parison in an injection mold and about a parison pin utilizing a valve element movable relative to the parison pin to fulfill a plurality of functions. First, the valve element 35 is normally biased to its position of FIGURE 1 by suitable means, i.e. the cylinder 51 and piston 50 or by an upwardly thrusting compression spring, if desired. In its position of FIGURE 1, the valve element accommodates the formation of the side walls of the parison, constituting the major portion of the parison, while supporting the parison pin against deflection or displacement due to the forces exerted thereon by the plasticized material introduced into the mold space 13.

Secondly, the pressure of the plasticized material introduced into the mold space 13 displaces the valve element 35 against the biasing means to accomodate the formation of the parison bottom. By utilizing the pressure of the plasticized material, any cavitation at the parison bottom is avoided and smooth and continuous formation of the parison bottom is insured. The introduction of the plasticized material into the region defining the parison bottom intermediate the end of the parison pin and the valve element is accommodated by the radial passage 59, this material also being under pressure and aiding in further displacing the valve body. Finally, the valve body serves to shut off the flow of plasticized material to the mold space 13 after the parison is completely formed to its final, blowable configuration. At the same time that the flow of plasticized material is interrupted, the movement of the valve body, by virtue of the fixed valve pin 55, prevents the further flow of material to the location of the bottom of the parison. The pin 55 empties the bore 54, forming a smooth parison bottom and preventing any material leakage through the radial passage 59.

I claim:

1. In an apparatus for making an inflatable parison of plasticized material and including a parison mold having a mold space with an open end communicating with a source of plasticized material under pressure and a parison pin projecting axially into the mold space to terminate short of the open end thereof, the improvements of a valve passage interposed between the mold space and said source, a valve body having one end projecting from said valve passage into the mold space for contacting the parison pin and a pressure land thereon exposed to material in said mold space, means biasing said valve body into contact with the parison pin to centralize said pin in said mold space until such time as the pressure in said mold space acting on said valve body land overcomes the force of said biasing means and shifts said valve body to a position wherein said valve body blocks said valve passage thus interrupting the flow of material from said source to said mold space, said valve body having a central bore and a radial passage opening into said central bore for continuing the flow of plasticized material to said mold space during shifting of the valve body, thereby forming a closed end on said parison, and means for closing said radial passage when said valve body is in said flow interrupting position thereof.

2. An apparatus for making a parison having a closed end and adapted to be blown to a final shape, comprising a parison mold enclosing a mold space open at each end, a parison pin projecting freely through one end of said mold space to terminate adjacent but spaced from the other end thereof, a source of plasticized material under pressure communicating freely with said other end, a movable valve element projecting through said other end and having an enlarged land thereon for controlling source-to-mold space communication, said land surface accommodating such communication in one position of said valve element and preventing such communication in a second position of said valve element, said valve element abutting the free end of said parison pin when in its one position and being spaced therefrom when in its other position, means normally biasing said valve element to its one position, said valve element having a central bore and a radial passage opening onto said bore, and a fixed valve pin in said bore, said valve pin clearing said radial passage when said valve element is in said one position and when said valve element is between said one position and said second position thereof to allow flow of plasticized material through said radial passage and said bore to a space between said parison pin and said valve element as said valve element shifts from said one position to said second position, and said valve pin blocking said radial passage when said valve element is in said second position thereof to prevent flow of plasticized material through said radial passage and said bore.

3. In an apparatus for making an inflatable parison of plasticized material and including a parison mold having a mold space with an open end communicating with a source of plasticized material under pressure and a parison pin projecting axially into the mold space to terminate short of the open end thereof, the improvements of an aligning means having a portion abutting the free end of said parison pin and preventing the formation of a closed parison end, said aligning means having a pressure land thereon concentric with said portion and projecting laterally to be exposed to material in said mold space when said aligning means is abutting said parison pin, means urging said aligning means into contact with the parison pin to centralize said pin in said mold space until such time as the pressure in said mold space acting on said aligning means land overcomes the force of said last named means, said pressure urging said aligning means to a position spaced from said parison pin end to accommodate the formation of the closed parison end.

4. In an apparatus for making an inflatable parison of plasticized material and including a parison mold having a mold space with an open end communicating with a source of plasticized material under pressure and a parison pin projecting axially into the mold space and terminating short of the open end thereof, the improvements of a valve passage between said source and said mold space through which plasticized material flows from said source to said mold space, a movable valve body projecting from said valve passage into said mold space for controlling source-to-mold space communication, said valve body having a central bore and a radial passage opening into said bore, a valve pin in said bore for opening and closing said radial passage upon movement of said valve body, said valve body having a first position in contact with said parison pin wherein said valve passage and said radial passage are open and wherein said valve body holds said parison pin centralized in said mold space, and said valve body having a second position spaced from said parison pin wherein said valve passage is blocked by said valve body and wherein said radial passage is blocked by said valve pin.

5. In an apparatus for making an inflatable parison of plasticized material and including a parison mold having a mold space with an open end communicating with a source of plasticized material under pressure and a parison pin projecting axially into the mold space and terminating short of the open end thereof, the improvements of a valve passage between said source and said mold space through which plasticized material flows from said source to said mold space, a movable valve body projecting from said valve passage into said mold space for controlling source-to-mold space communication, said valve body having a central bore and a radial passage opening into said bore, a valve pin in said bore for opening and closing said radial passage upon movement of said valve body, said valve body having a first position in contact with said parison pin wherein said valve passage and said radial passage are open and wherein said valve body holds said parison pin centralized in said mold space, and said valve body having a second position spaced from said parison pin wherein said valve passage is blocked by said valve body and wherein said radial passage is blocked by said valve pin, and means for shifting said valve body between said positions thereof
   (1) to allow flow of plasticized material into said mold space when said valve body is in said first position thereof,
   (2) to allow flow of plasticized material to the space between said valve body and said parison pin when said valve body is moving between said positions thereof, and
   (3) to block said valve passage with said valve body and to block said radial passage with said valve pin when said valve body is in said second position thereof.

6. In an apparatus for making an inflatable parison of plasticized material and including a parison mold having a mold space with an open end communicating with a source of plasticized material under pressure and a parison pin projecting axially into the mold space and terminating short of the open end thereof, the improvements of a valve passage between said source and said mold space through which plasticized material flows from said source to said mold space, a movable valve body projecting from said valve passage into said mold space for controlling source-to-mold space communication, said valve body having a face for contacting said parison pin and a pressure land surrounding said face and larger in diameter than said face and said parison pin, said valve body further having a central bore and a radial passage opening into said bore, a valve pin in said bore for opening and closing said radial passage upon movement of said valve body, said valve body having a first position in contact with said parison pin wherein said valve body holds said parison pin centralized in said mold space, and said valve body having a second position spaced from said parison pin wherein said valve passage is blocked by said valve body and wherein said radial passage is blocked by said valve pin, means for urging said valve body to said first position thereof wherein said face of said valve body contacts said parison pin and plasticized material flows from said source through said valve passage into said mold space, said valve body moving to said second position thereof in response to pressure acting on said pressure land to accommodate flow of plasticized material through said radial passage and said bore during said movement of said valve body to fill the space between said valve body and said parison pin and to close said valve passage and said radial passage when said valve body reaches said second position thereof.

References Cited by the Examiner

UNITED STATES PATENTS

| | | | |
|---|---|---|---|
| 2,262,612 | 11/1941 | Kopitke | 264—97 |
| 2,301,338 | 11/1942 | Smith. | |
| 2,825,093 | 3/1958 | High. | |
| 3,204,293 | 9/1965 | Brownson et al. | 18—5 |

FOREIGN PATENTS

| | | |
|---|---|---|
| 962,726 | 12/1949 | France. |
| 909,555 | 10/1962 | Great Britain. |

J. SPENCER OVERHOLSER, *Primary Examiner.*

W. L. McBAY, *Assistant Examiner.*